United States Patent
Furukawa et al.

(10) Patent No.: US 7,427,720 B2
(45) Date of Patent: Sep. 23, 2008

(54) SEAT-WEIGHT SENSOR SUPPORT FOR REDUCING PHYSICAL EFFECTS

(75) Inventors: Takashi Furukawa, Wako (JP); Tatsuya Yamazaki, Wako (JP); Harutomi Nishide, Wako (JP); Yoshitaka Suzuki, Wako (JP); Nobuhiro Koyota, Wako (JP); Seiji Takaya, Wako (JP); Naotaka Kumakiri, Wako (JP); Mikihito Kojima, Wako (JP); Masashi Yoshifuku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 11/427,558

(22) Filed: Jun. 29, 2006

(65) Prior Publication Data

US 2007/0001832 A1    Jan. 4, 2007

(30) Foreign Application Priority Data

Jun. 30, 2005  (JP)  ............. 2005-192299

(51) Int. Cl.
*G01G 3/13*   (2006.01)
*G01L 1/18*   (2006.01)
*G01B 7/16*   (2006.01)
*B60R 21/015* (2006.01)

(52) U.S. Cl. ............. 177/211; 73/862.621; 73/862.627; 180/273

(58) Field of Classification Search ............ 73/862.621, 73/862.625–863.639; 177/144, 211, 229; 180/273; 280/735
See application file for complete search history.

(56) References Cited

U.S. PATENT DOCUMENTS

| | | | | |
|---|---|---|---|---|
| 4,800,973 A | * | 1/1989 | Angel | ............. 177/211 |
| 4,813,504 A | * | 3/1989 | Kroll | ............. 177/21 |
| 5,205,369 A | * | 4/1993 | Neeleman | ............. 177/229 |
| 5,250,762 A | * | 10/1993 | Gustafsson et al. | ......... 177/244 |
| 6,161,891 A | | 12/2000 | Blakesley | |
| 6,916,997 B2 | * | 7/2005 | Thakur et al. | ............. 177/136 |
| 6,931,947 B2 | * | 8/2005 | Schulze et al. | ......... 73/862.381 |
| 6,969,809 B2 | * | 11/2005 | Rainey | ............. 177/136 |
| 7,112,749 B2 | * | 9/2006 | DiPaola et al. | ............. 177/136 |
| 7,189,931 B2 | * | 3/2007 | Hida et al. | ............. 177/144 |
| 7,220,924 B2 | * | 5/2007 | Burkhard | ............. 177/229 |
| 2003/0106723 A1 | | 6/2003 | Thakur et al. | |
| 2005/0039549 A1 | * | 2/2005 | Teraoka | ............. 73/862.627 |
| 2005/0061643 A1 | | 3/2005 | Rainey | |
| 2005/0241415 A1 | * | 11/2005 | Germanton | ............. 73/862.632 |

FOREIGN PATENT DOCUMENTS

| | | |
|---|---|---|
| JP | 04-324332 | 11/1992 |
| JP | 4-131726 | 12/1992 |
| JP | 11-295162 | 10/1999 |
| JP | 2003-291707 | 10/2003 |
| JP | 2005-172801 | 6/2005 |

* cited by examiner

*Primary Examiner*—Randy W Gibson
(74) *Attorney, Agent, or Firm*—Rankin, Hill & Clark LLP (57) ABSTRACT

A seat-weight sensor includes a load cell having a load sensor arranged therein and a support for holding a support shaft of the load cell. The support includes a convex portion to hold the support shaft and a pair of flange portions arranged at both sides of the convex portion and fixed to a vehicle floor side. The support has a pair of slots arranged at a perimeter of the convex portion and for reducing a physical effect that the pair of flanges provides to the convex portion.

17 Claims, 6 Drawing Sheets

SEAT-WEIGHT SENSOR SUPPORT FOR REDUCING PHYSICAL EFFECTS

This application is based on and claims the benefit of priority from Japanese Patent Application No. 2005-192299, filed on Jun. 30, 2005, the content of which is incorporated herein by reference.

BACKGROUND OF THE INVENTION

1. Field of the Invention

The present invention relates to seat-weight sensors, and more particularly, to seat-weight sensors for sensing a load of an occupant sitting on a vehicle seat.

2. Related Art

An airbag system as a restraint device is mounted, for example, on a driver's seat of an automotive vehicle. The airbag system includes an airbag wherein when undergoing a strong impact by a frontal collision; the airbag is inflated instantaneously to restrain a driver. In recent years, the airbag system is also mounted on a passenger's seat so as to restrain a passenger or occupant sitting on the passenger's seat from a collision impact.

A seat-weight sensor is mounted on the passenger's seat so as to sense the presence or absence of an occupant and a load thereof. The airbag system is controlled in accordance with a detection signal of the seat-weight sensor. The airbag system is controlled, for example, such that when a given load is sensed, the airbag is activated, whereas when the sensed load is smaller than the given load, the airbag is not activated.

The seat-weight sensor is arranged, for example, in each of four corners of the seat. The seat-weight sensor is formed of a rectangular sensor plate having a distortion gauge in the constricted center portion. The sensor plate has one end fixed to a seat frame for holding the seat and the other end fixed to a slide rail (upper slide rail). A load of the occupant sitting on the seat causes a deflection of the sensor plate, the amount of deflection being converted into an electric signal by a resistance-type distortion gauge, sensing the load of the occupant. In this connection, refer to U.S. Pat. No. 6,161,891 issued to Blakesley (Patent document 1).

According to the invention of Patent document 1, the weight or load of the occupant sitting on the seat can be estimated by totaling detection values of four seat-weight sensors, for example.

The seat-weight sensor disclosed in Patent document 1 and formed of a rectangular sensor plate having a distortion gauge needs a rolling restraining member and a lot of coupling members, raising a problem of complicated structure. In recent years, seat-weight sensors of simple structure devoted solely to vehicle seats have been developed; in which a seat frame and an upper slide rail are coupled directly to allow sensing of a vertical load of the seat only. Such seat-weight sensors are referred to, for example, as load cells (compression-type load cells). Hereafter, the seat-weight sensor is referred to as a load cell.

SUMMARY OF THE INVENTION

The present invention is made in view of the above problem, and aims to provide a seat-weight sensor that does not adversely affect the load sensor arranged in the support when fastening the flange portions to the slide rail without increasing the number of parts.

In order to solve the above problem, the following seat-weight sensor has been invented, wherein the flange portions and the center portion for supporting the load cell are partly separated.

The present invention provides generally a seat-weight sensor for sensing a load of an occupant sitting on a seat, the seat-weight sensor being interposed between the seat and a vehicle floor, including: a load cell having a load sensor arranged therein; and a support that holds the load cell, the support including a convex portion to hold the load cell and a pair of flange portions arranged at both sides of the convex portion and fixed to a vehicle floor side, the support having a pair of slots arranged at a perimeter of the convex portion, the pair of slots reducing a physical effect that the pair of flange portions provide to the convex portion. Fixing to the vehicle floor side means that the flange portions are in positions nearer to the vehicle floor rather than the seat.

According to one aspect of the present invention, there is provided a seat-weight sensor for sensing a load of an occupant sitting on a seat, the seat-weight sensor being interposed between the seat and a vehicle floor, including: a load cell having a load sensor arranged therein; and a support that holds a support shaft of the load cell, the support including a convex portion having a protuberant center to hold the support shaft and a pair of flanges arranged at both sides of the convex portion and fixed to a vehicle floor side, the support having a pair of slots arranged at a perimeter of the convex portion, the pair of slots reducing a stress that the pair of flanges provide to the convex portion.

The seat-weight sensor of the present invention is interposed between a seat and a vehicle floor to sense a load of a passenger sitting on the seat. The seat-weight sensor includes a load cell having a load sensor arranged therein and a support for holding a support shaft of the load cell.

The seat-weight sensor is provided principally to a passenger's seat of an automotive vehicle to sense a load of a passenger sitting on the seat. An airbag system mounted to the passenger's seat is controlled in accordance with a detection signal of the seat-weight sensor. Typically, a seat unit mounted on an automotive vehicle includes a seat and a backrest, wherein a weight or load of a passenger sitting on the seat can be estimated by a seat-weight sensor interposed between the seat and the vehicle floor.

A cylindrical load sensor such as a load-voltage conversion element, for example, is arranged in the load cell. In this invention, the load sensor refers to a load sensing element described above, and the seat-weight sensor refers to a structure obtained by combining the load sensing element and support. Such seat-weight sensor is referred to as a load cell. For example, the load cell has one end to which a male thread is provided and the other end to which a support shaft is provided. The male thread and support shaft protrude in the opposite directions. The male thread is fixed to the seat, and the support is fixed to the vehicle floor side.

With the seat-weight sensor, the support includes a convex portion, and a pair of flange portions. The convex portion has a protuberant center to hold the support shaft, and the pair of flange portions are arranged at both sides of the convex portion and fixed to the vehicle floor side.

The support is made of metal, for example, and can be formed in a desired shape by metal molding. The convex portion located in the center of the support may be protuberant in a square prism, for example, wherein the convex portion of the square prism holds the support shaft. The feature that the convex portion holds the support shaft may designate that one end of the support shaft is held by the convex portion. The feature that the convex portion is protuberant may designate that the convex portion and the pair of flange portions are formed integrally. When arranging a pair of flange portions at both sides of the convex portion, the flange portions are preferably arranged at both sides of the convex portion to be symmetrical and have the same length, width, and thickness. Optionally, the pair of flange portions may be formed asymmetrically, if necessary.

The feature that the pair of flange portions is fixed to the vehicle floor may designate that the support shaft having pair of flange portions is fixed to the upper slide rail with the convex portion turned face up. The feature that the support shaft is fixed to the upper slide rail may designate that the pair of flange portions are fixed to the upper slide rail by a fastener including a bolt and a nut, wherein a pair of holes into which bolts are inserted are arranged in the pair of flange portions. The bolts are provided to the upper slide rail, and the nuts are provided to the pair flange portions. Optionally, direct female-thread processing may be given to the pair of flange portions to fix the flange portions with bolts.

With the seat-weight sensor, the support has a pair of slots arranged at a perimeter of the convex portion, the pair of slots reducing a stress that the pair of flange portions provides to the convex portion.

The feature that the pair of slots reduces a stress that the pair of flange portions provides to the convex portion may designate that the pair of slots as will be described later reduce a distortion that the pair of flange portions provide to the convex portion. A distortion is an amount of deformation resulting from a stress. In order that a stress produced at the pair of flange portions may not affect the convex portion, the pair of slots reduces this stress. The stress acting on the convex portion may include a compression stress, a tensile stress, and a bending moment. Suppose that the support is a beam, a bending moment produced at the beam acts on one face as a compression stress, and the other face as a tensile stress. When fixing the pair of flange portions to the upper slide rail, for example, it is assumed that not a simple stress but composite stresses act on the pair of flange portions in most cases.

The feature of reducing a stress acting on the convex portion may designate that when the load sensor senses a load, there is less influence of a stress transmitted to the convex portion coupled to the load sensor through the support shaft, and that the load sensor can correctly sense a passenger's load. Physically, the convex portion and the pair of flange portions are coupled partly, so that it cannot be said that a stress produced at the pair of flange portions does not affect the convex portion at all.

As for the shape of the slots, each slot includes preferably at least a first slot portion extending in a direction substantially orthogonal to a direction going from the convex portion to the ends of the pair of flange portions. The slot of the present invention is not a recess and has a periphery that may be defined by a member itself of the support. Specifically, the slot means a hole having a narrow clearance, and not a round or square hole. Moreover, the slot is a through hole, and not a bottomed hole like a groove. A pair of slots is arranged at a perimeter of the convex portion.

The seat-weight sensor is configured to have a pair of slots arranged at a perimeter of the convex portion holding the support shaft of the load cell, the pair of slots reducing a stress that the pair of flange portions provides to the convex portion. This seat-weight sensor has advantages of no use of a lot of parts as distinct from the related art and no exertion of a bad influence on the load sensor arranged in the load cell through the support shaft when fastening the flange portions to the slide rail.

According to another aspect of the present invention, there is provided a seat-weight sensor for sensing a load of an occupant sitting on a seat, the seat-weight sensor being interposed between the seat and a vehicle floor, including: a load cell having a load sensor arranged therein; and a support that holds a support shaft of the load cell, the support including a convex portion having a protuberant center to hold the support shaft and a pair of flange portions arranged at both sides of the convex portion and fixed to the vehicle floor, the support having a pair of slots arranged at a perimeter of the convex portion, the pair of slots reducing a distortion that the pair of flange portions provide to the convex portion.

For example, the distortion may include a distortion produced by such a process that a fastening torque of the pair of nuts leans to one side, so that the pair of flange portions may be distorted, which applies pressure to the support shaft. Further, the distortion may include a distortion produced by such a process that the mounting position of the bolts is not appropriate, so that the pair of flange portions may be distorted by being compressed to each other, which applies pressure to the support shaft. Furthermore, the distortion may include a distortion produced by such a process that the flatness of the upper slide rail is not excellent, so that the pair of flange portions undergo a turning moment and may be distorted, which may deform the support shaft.

According to still another aspect of the present invention, the support has both sides continuously extending from the convex portion to ends of the pair of flange portions, wherein an area of the support interposed between the both sides and the convex portion are separated by the pair of slots to form a discontinuity therebetween.

The area of the support interposed between the both sides includes an area pressed by the nuts for fixing the flange portions. The feature of forming a discontinuity therebetween may designate that the area and the convex portion are isolated from each other.

The pair of slots of the present invention is effective in reducing a stress to the convex portion for supporting the load cell by making a stress of the flange portions detour the both sides of the support. When making a tensile stress act on the plate formed with elliptic holes, stress concentration occurs at the two opposite elliptic holes orthogonal to the direction of tensile stress. Using such a phenomenon, the pair of slots reduces a stress to the convex portion.

According to still another aspect of the present invention, the seat-weight sensor further includes a pair of ribs arranged at the both sides of the support, the pair of ribs being protuberant from the both sides.

The rib is a reinforcing member provided to the plane at right angles so as to prevent a deformation of a plate. The plate corresponds to the support of the present invention. As described above, in order to complement stress concentration resulting from arrangement of a pair of slots, a pair of ribs is arranged at the both sides of the support. The feature that the pair of ribs is protuberant from the both sides may designate that the pair of ribs are integrally molded with the support. According to this aspect of the present invention, a reduction is compensated in strength of the pair of flange portions due to arrangement of the pair of slots. In such a way, arrangement of the pair of ribs at the support allows the seat-weight sensor to cope with tensile load acting thereon in the event of minor collision of the automotive vehicle, for example.

According to a further aspect of the present invention, the pair of ribs is connected to the convex portion.

The protuberance height of the pair of ribs is the same as that of the square-prism-shaped convex portion, for example, wherein part of the pair of ribs and part of the convex portion are preferably connected to each other. If all the sides of the convex portion are connected to the pair of ribs, a distortion of the pair of flange portions can be transmitted to the convex portion through the ribs.

According to a still further aspect of the present invention, the pair of slots each include a first slot portion extending in a direction substantially orthogonal to a direction going from the convex portion to the ends of the pair of flange portions and a pair of second slot portions each turning from a terminal end of the first slot portion and extending in parallel to the direction going from the convex portion to the ends of the pair of flange portions so as to approach the corresponding second slot portion.

The feature of turning from a terminal end of the first slot portion may include a mode of turning substantially perpendicularly. The feature of approaching the corresponding second slot portion may designate that the terminal ends are separated by a given distance. The given distance may be a width of a pair of connections in which part of the pair of ribs and part of the convex portion are connected to each other.

According to a further aspect of the present invention, the seat-weight sensor is arranged in each of four corners of the seat.

For example, a weight or load of a passenger sitting on the seat can be estimated by totaling detection values of the four seat-weight sensors.

The seat-weight sensor of the present invention is configured to have a pair of slots arranged at a perimeter of the convex portion holding the support shaft of the load cell, the pair of slots reducing a stress that the pair of flange portions provides to the convex portion. This seat-weight sensor has advantages of no use of a lot of parts as distinct from the related art and no exertion of a bad influence on the load sensor arranged in the load cell through the support shaft when fastening the flange portions to the slide rail.

Moreover, the seat-weight sensor of the present invention is configured to have a pair of ribs arranged at the both sides of the support so as to complement stress concentration resulting from arrangement of a pair of slots. With this, the strength of the support can be maintained without interfering correct measurement by the load sensor.

DETAILED DESCRIPTION OF THE INVENTION

Before describing the best mode for carrying out the present invention, the related art will be described in detail.

Figure 3:
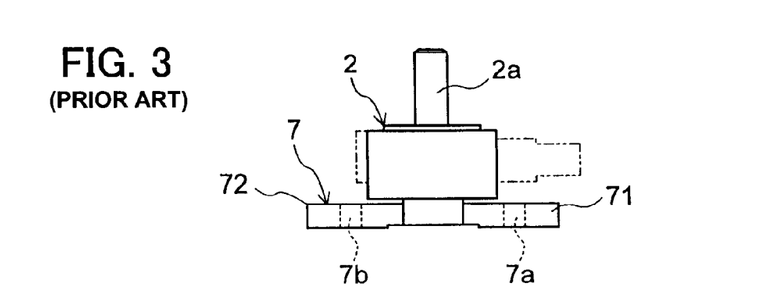
FIG. 3 is a front view showing a seat-weight sensor in the related art.

FIG. 3 is a front view of the load cell. Referring to FIG. 3, a support 7 is coupled to the load cell 2. The support 7 includes at both sides (wings) a pair of flange portions 71 and 72 extending in the opposite directions. The pair of flange portions 71 and 72 is formed with a pair of mounting holes 7a and 7b through which the pair of flange portions are fixed to the upper slide rail as will be described later by a fastener including a nut, bolt, etc. On the other hand, a male thread 2a protrudes from the top the load cell 2 and is fixed thereto by a fastener such as a nut through a rubber washer as will be described later.

Figure 4:
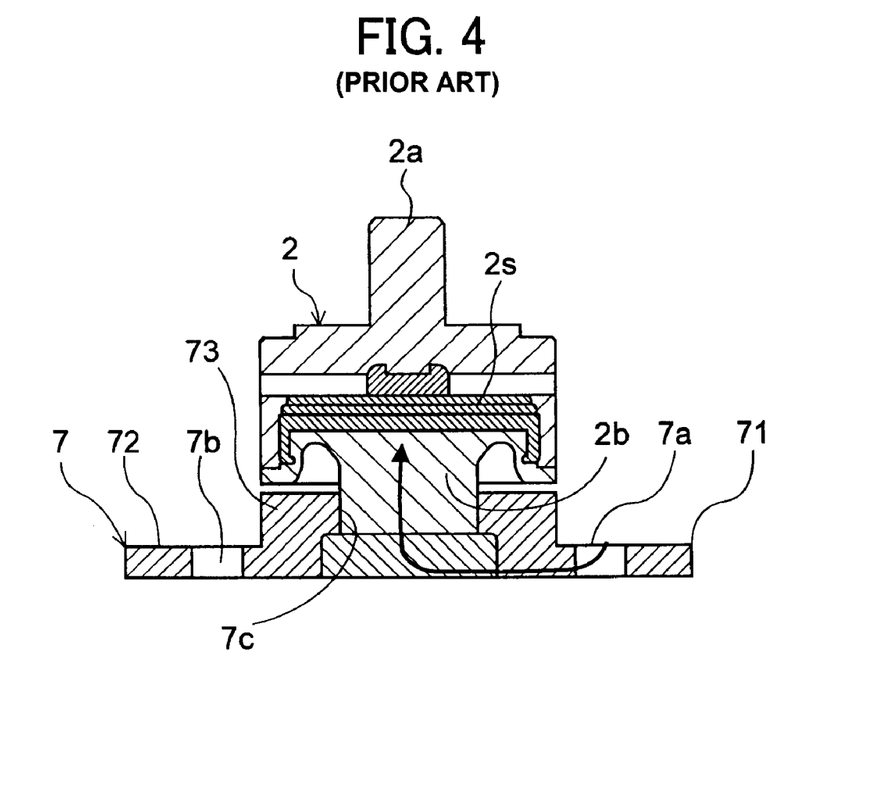
FIG. 4 is a longitudinal sectional view showing the related-art seat-weight sensor.
Figure 5:
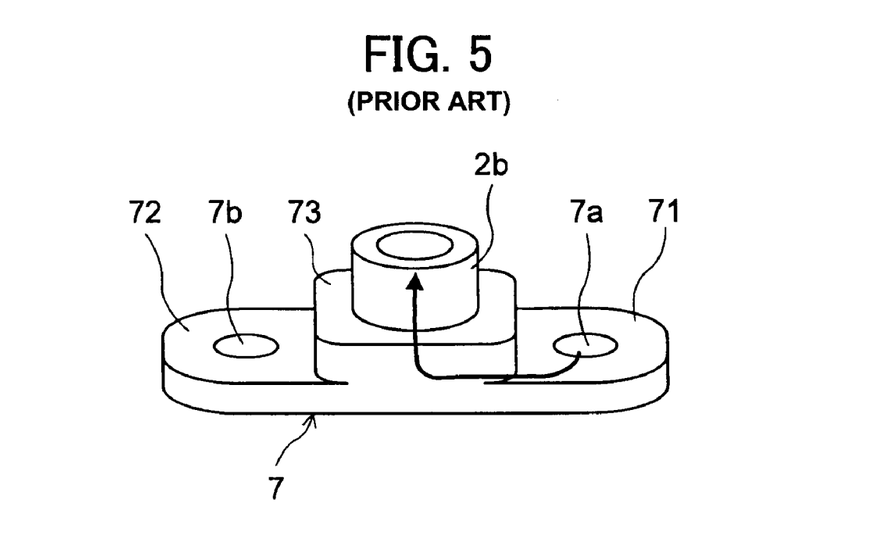
FIG. 5 is a perspective external view showing the related-art seat-weight sensor.

FIG. 4 is a longitudinal sectional view of FIG. 3, and FIG. 5 is a perspective external view of the load cell. Referring to FIG. 4, a cylindrical load sensor 2s such as a load-voltage conversion element, for example, is arranged in the load cell 2. The load cell 2 is a kind of joint by which a plurality of rigid members are coupled to each other, and includes an anti-rolling mechanism. With the load cell 2, the male thread 2a is provided to one rigid member, and a support shaft 2b protrudes from the other rigid member.

A square-prism-shaped convex portion 73 is protuberant in the center of the support 7 (see FIG. 5). An insertion hole 7c for holding the support shaft 2b is formed in the convex portion 73 (see FIG. 4). The support 7 is connected to the support shaft 2b. Referring to FIG. 4, a vertical load applied to the load cell 2 is sensed by the load sensor 2s. Referring to FIG. 4, a connector, not illustrated, is attached to the load cell 2 and is connected to the load sensor 2s. This connector is connected to the airbag system.

Figure 6A:
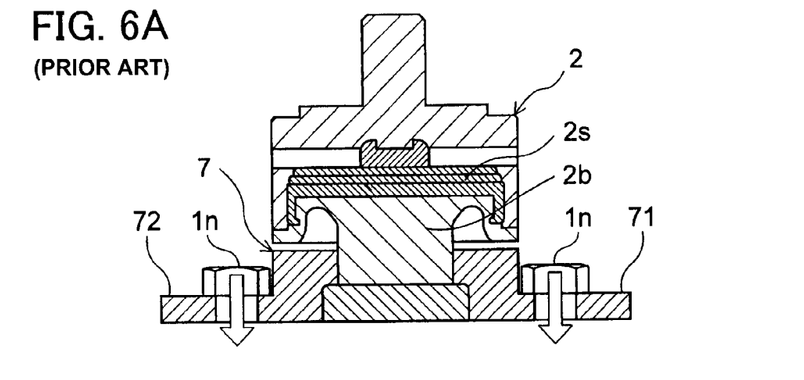
FIGS. 6A-6C are views similar to FIG. 4, showing the related-art seat-weight sensor fixed on an upper side rail by a pair of nuts.
Figure 6B:
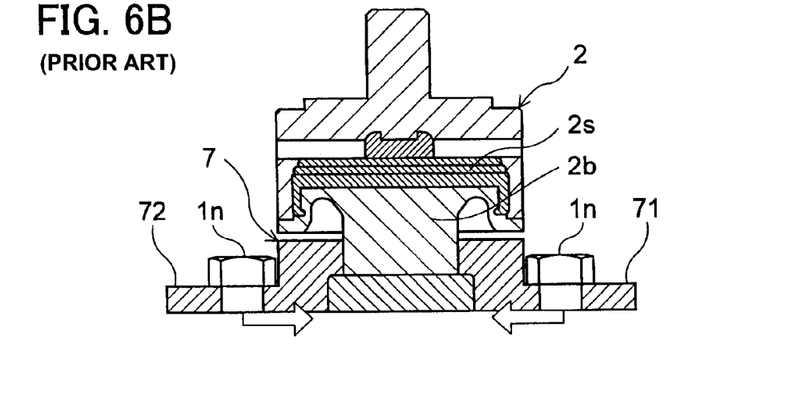
Figure 6C:
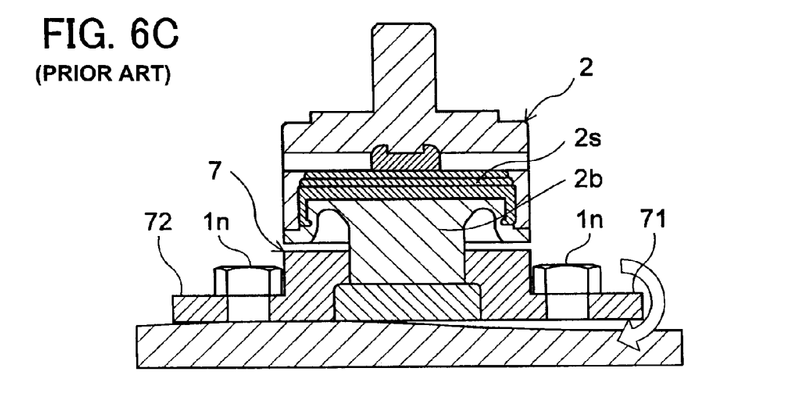

The pair of flange portions 71 and 72 is fixed to the upper slide rail by a fastener including a nut, bolt, etc. FIGS. 6A to 6C are views each showing a state in which the support 7 is fixed to the upper slide rail by a pair of nuts 1n. Note that the bolts are not illustrated in FIGS. 6A to 6C, and the upper slide rail is solely illustrated in FIG. 6C. In order for the load sensor 2s to detect a vertical load correctly, the support shaft 2b needs to perpendicularly be attached to the bottom of the support 7.

In the state shown in FIG. 6A, a fastening torque of the pair of nuts 1n leans to one side, so that the pair of flange portions 71 and 72 may be distorted, which applies pressure to the support shaft 2b in the direction of arrows, raising in some cases the difficulty of correct sensing of a load of the occupant. In the state shown in FIG. 6B, the mounting position of the bolts is not appropriate, so that the pair of flange portions 71 and 72 may be distorted by being compressed to each other, which applies pressure to the support shaft 2b in the direction of arrows, also raising in some cases the difficulty of correct sensing of a load of the occupant. In the state shown in FIG. 6C, the flatness of the upper slide rail is not excellent, so that the pair of flange portions 71 and 72 undergo a turning moment in the direction of arrow and may be distorted, which may deform the support shaft 2b, also raising in some cases the difficulty of correct sensing of a load of the occupant. Note that although the upper slide rail provides flatness when the support 7 is attached thereto, the upper slide rail may produce an elastic deformation when being sliding, falling in some cases in the state shown in FIG. 6C. Note that curved arrows in FIGS. 4 and 5 designate that a distortion of the flange portion affects the support shaft 2b.

Figure 7:
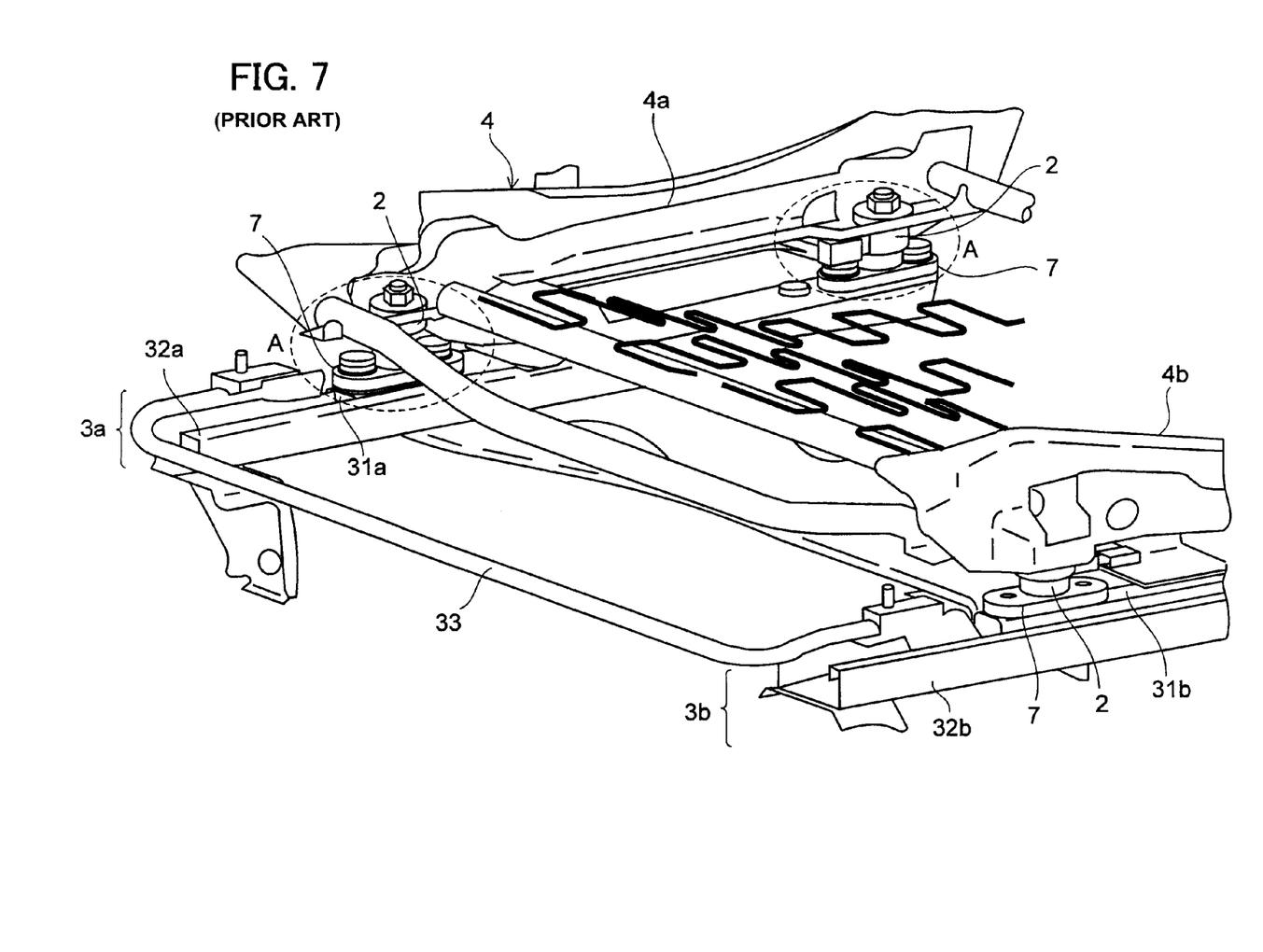
FIG. 7 is a perspective external view showing a seat potion to which the related-art seat-weight sensor is mounted.
Figure 8:
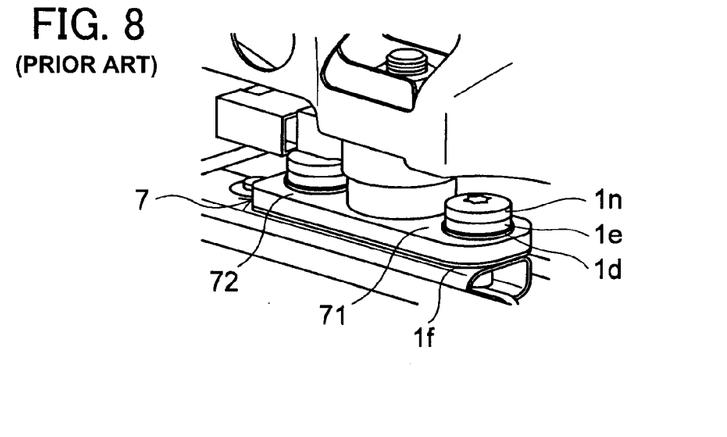
FIG. 8 is a fragmentary enlarged view showing sections A encircled by broken lines in FIG. 7.
Figure 9:
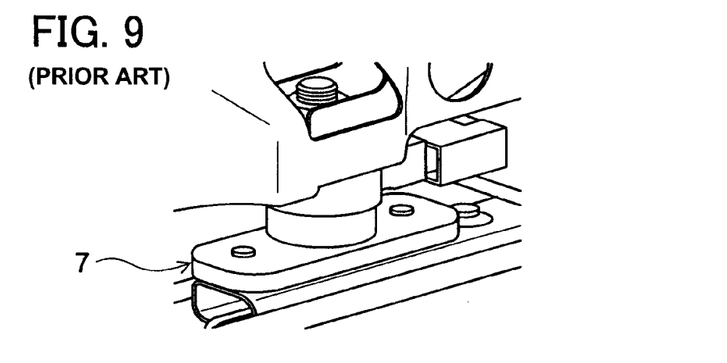
FIG. 9 is a fragmentary enlarged view showing a load cell opposed to the section A in FIG. 7.
Figure 10:
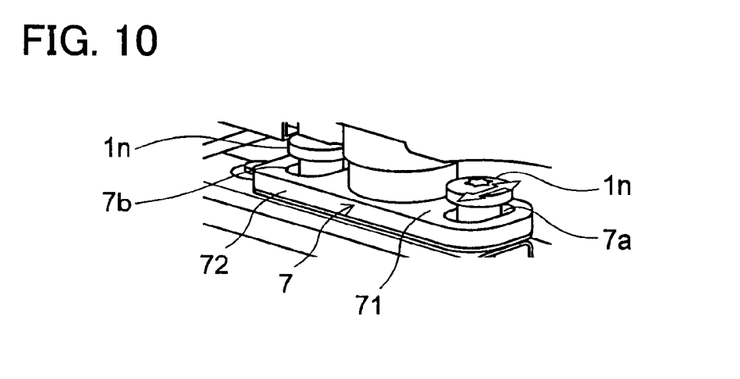
FIG. 10 is a fragmentary enlarged view showing the section A in FIG. 7, with component elements being omitted partly.

The following measures are taken in order to cope with the inconvenience described above. FIG. 7 is a perspective external view of a seat portion. FIG. 8 is a fragmentary enlarged view showing sections A encircled by broken lines in FIG. 7. FIG. 9 is a fragmentary enlarged view showing a load cell opposed to the section A in FIG. 7. FIG. 10 is a fragmentary enlarged view showing the section A in FIG. 7, with component elements being omitted partly.

Referring to FIG. 7, the seat portion includes a pair of slide rails 3a and 3b. The slide rail 3a includes an upper slide rail 31a and a lower slide rail 32a, and the slide rail 3b includes an upper slide rail 31b and a lower slide rail 32b. The pair of lower slide rails 32a and 32b are fixed to a vehicle floor, and the pair of upper slide rails 31a and 31b each have one end coupled to a lever 33. A seat, not illustrated, can be slid by holding the lever 33.

A seat frame 4 includes a pair of seat-frame portions 4a and 4b, which are coupled, for example, by a plurality of pipes. The seat is fixed on the seat frame 4. The load cell 2 is arranged in each of four corners defined by the pair of upper slide rail 31a and 31b. Referring to FIG. 7, with the load cell 2 on the side of the slide rail 3a, the support 7 is slidably held on the upper slide rail 31a. With the load cell 2 on the side of the slide rail 3b, the support 7 is fixed to the upper slide rail 31b (see also FIG. 9). Note that one load cell 2 on the side of the slide rail 3b is not illustrated.

Referring to FIG. 8, a rubber washer 1e and a Drymet washer 1d are interposed between each of the flange portions 71 and 72 and the nut 1n. An oilless sheet 1f is interposed between the bottom face of the support 7 and the top face of the upper slide rail 31a. Referring to FIG. 10, a pair of mounting holes 7a and 7b includes slots that allow movement in the direction orthogonal to the direction along which the upper slide rail 31a extends.

Referring to FIG. 8, in order to prevent the nut 1n from providing a distortion to each of the flange portions 71 and 72 when fastened by a torque greater than appropriate torque, the rubber washer 1e resiliently biases each of the flange portions 71 and 72. The rubber washer 1e also serves as a slack stop of the nut 1n. The Drymet washer 1d is an oilless washer including three layers of a synthetic-resin layer, a sintered-metal layer, and a metal layer. In the state of holding each of the flange portions 71 and 72, the Drymet washer 1d and the oilless sheet 1f are attached to the upper slide rail 31a. Application of such a slide structure allows absorption of an assembling error and a deformation during movement of the upper slide rail 31a, preventing a distortion of the flange portions 71 and 72.

However, such measures against a distortion of the load cell result in the increasing number of parts, and merely provide a slight improvement as compared with the structure of the related art. Then, seat-weight sensors are demanded which does not adversely affect the load sensor arranged in the support when fastening the flange portions to the slide rail without increasing the number of parts. This is a problem to be solved by the present invention.

Referring to the drawings, the best mode for carrying out the present invention will be described hereafter.

Figure 1:
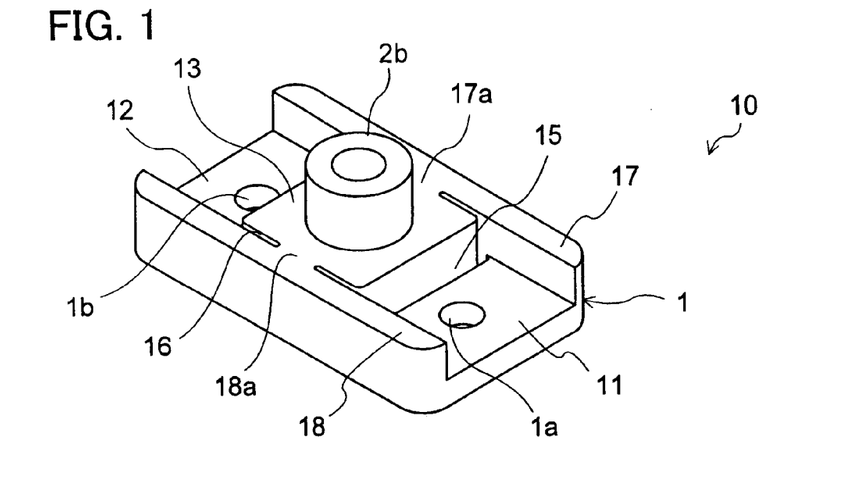
FIG. 1 is a perspective external view showing an embodiment of a seat-weight sensor according to the present invention.
Figure 2:
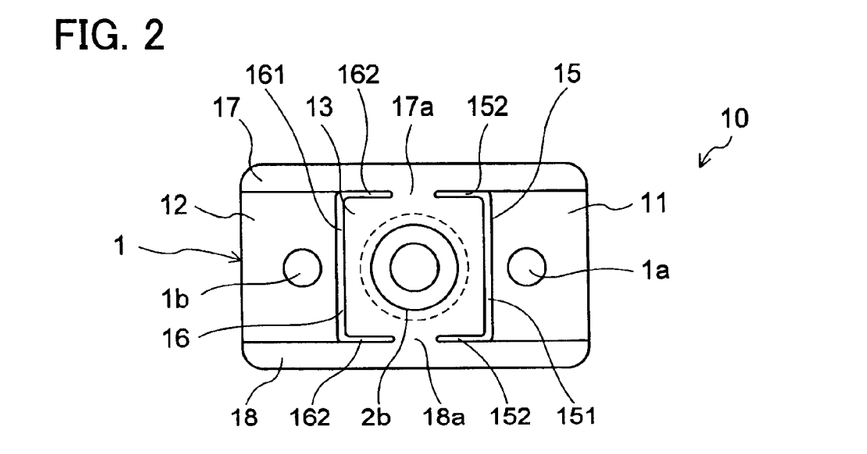
FIG. 2 is a plan view showing the seat-weight sensor in the embodiment.

FIG. 1 is a perspective external view showing an embodiment of a seat-weight sensor according to the present invention. FIG. 2 is a plan view showing the seat-weight sensor in the embodiment. In FIGS. 1 and 2, with a load cell not illustrated, only a support shaft is illustrated. Referring also to FIGS. 3 to 10 as required, a description will be made about the embodiment of the present invention.

Figure 11:
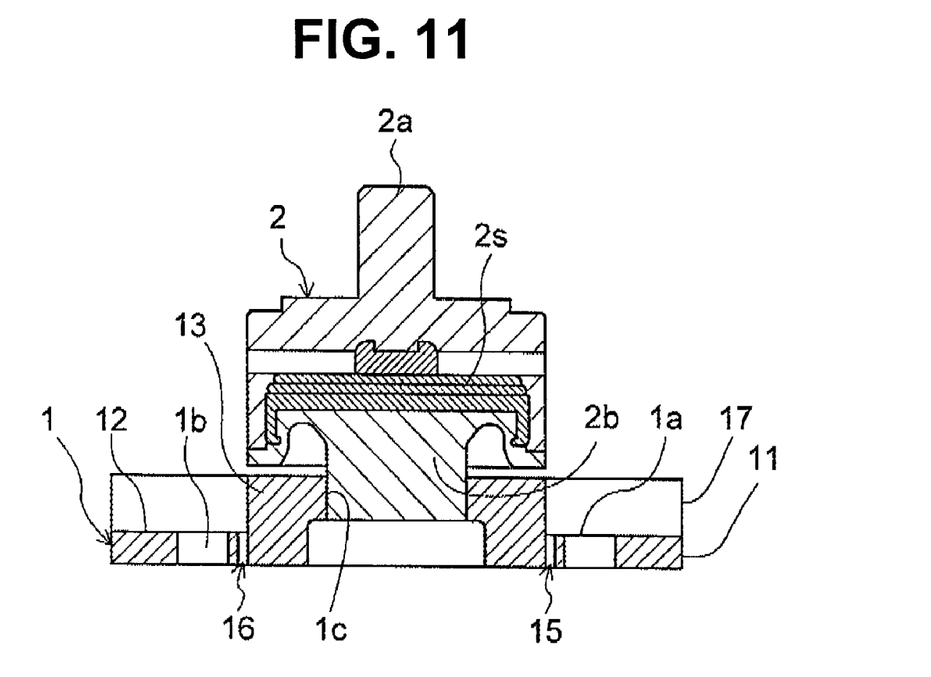

First, the configuration of a seat-weight sensor 10 according to the present invention will be described. Referring to FIGS. 1 and 2, the seat-weight sensor 10 includes a load cell 2 having a load sensor 2s arranged therein (see FIG. 11). Referring to FIG. 11, the load cell 2 has one end to which a male thread 2a is provided and the other end to which a support shaft 2b is provided. The male thread 2a and support shaft 2b protrude in the opposite directions. The male thread 2a is fixed to the seat, and the support 2b is fixed to the vehicle floor. Further, as shown in FIG. 11, the support shaft 2b is supported by the insertion hole 1c. The support shaft 2b is secured to the insertion hole 1c as in a conventional seat-weight sensor, using welding or other conventional techniques.

The seat-weight sensor 10 includes support 1 for holding the support shaft 2b of the load cell 2. The support 1 includes a convex portion 13 having a protuberant center to hold the support shaft 2b and a pair of flange portions 11 and 12 arranged at both sides (wings) of the convex portion 13 to extend in the opposite directions. The convex portion 13 located in the center of the support 1 is protuberant in a square prism. The support 1 can be formed in a desired shape by metal molding.

The pair of flange portions 11 and 12 shown in FIGS. 1 and 2 is fixed to the vehicle floor. Referring to FIG. 7, the support 1 including pair of flange portions 11 and 12 is fixed to the upper slide rail with the convex portion 13 turned face up, for example. The feature that the support 1 is fixed to the upper slide rail may designate that the pair of flange portions 11 and 12 are fixed to the upper slide rail by a fastener including a bolt and a nut, wherein a pair of holes 1a and 1b into which bolts are inserted are arranged in the pair of flange portions 11 and 12. The bolts are provided to the upper slide rail, and the nuts are provided to the pair of flange portions 11 and 12.

With the seat-weight sensor 10, as shown in FIGS. 1 and 2, a pair of slots 15 and 16 are arranged at a perimeter of the convex portion 13 to reduce a stress that the pair of flange portions 11 and 12 provide to the convex portion 13.

Referring to FIGS. 1 and 2, the pair of slots 15 and 16 includes first slot portions 151 and 161 extending in the direction substantially orthogonal to the direction going from the convex portion 13 to the ends of the pair of flange portions 11 and 12. The pair of slots 15 and 16 also include a pair of second slot portions 152 and 162 turning from respective terminal ends of the first slot portions 151 and 161 and extending in parallel to the direction going from the convex portion 13 to the ends of the pair of flange portions 11 and 12 so as to approach the corresponding second slot portions 152 and 162.

Referring to FIGS. 1 and 2, a pair of ribs 17 and 18 is arranged at the both sides of the support 1 to be protuberant from the both sides. The pair of ribs 17 and 18 is connected to the protrusion 13. The protuberance height of the pair of ribs 17 and 18 is the same as that of the square-prism-shaped convex portion 13, wherein part of the pair of ribs 17 and 18 and part of the convex portion 13 are connected to each other, forming a pair of connections 17a and 18a. The width of the pair of connections 17a and 18a is the same as a given distance by which the respective terminal ends of the pair of second slots 152 and 162 are separated.

Next, the operation of the seat-weight sensor 10 of the present invention will be described.

The seat-weight sensor 10 is provided principally to a passenger's seat of an automotive vehicle to sense a load of a passenger or occupant sitting on the seat. An airbag system mounted to the passenger's seat is controlled in accordance with a detection signal of the seat-weight sensor 10. Typically, a seat unit mounted on an automotive vehicle includes a seat and a backrest, wherein the weight or load of a passenger sitting on the seat can be estimated by the seat-weight sensor 10 interposed between the seat and the vehicle floor. The seat-weight sensor 10 is arranged, for example, in each of four corners of the seat. The weight or load of a passenger sitting on the seat can be estimated by totaling detection values of the four seat-weight sensors 10.

The pair of slots 15 and 16 reduces a stress that the pair of flange portions 11 and 12 provides to the convex portion 13. Moreover, the pair of slots 15 and 16 reduces a distortion that the pair of flange portions 11 and 12 provides to the convex portion 13. A distortion is an amount of deformation resulting from a stress. In order that a stress produced at the pair of flange portions 11 and 12 may not affect the convex portion 13, the pair of slots 15 and 16 reduce this stress. A stress acting on the convex portion 13 includes a compression stress, a tensile stress, and a bending moment. Suppose that the support 1 is a beam, a bending moment produced at the beam acts on one face as a compression stress, and the other face as a tensile stress. When fixing the pair of flange portions 11 and 12 to the upper slide rail, for example, it is assumed that not a simple stress but composite stresses act on the pair of flange portions 11 and 12 in most cases.

The feature of reducing a stress acting on the convex portion 13 may designate that when the load sensor 2s senses a load, there is less influence of a stress transmitted to the convex portion 13 coupled to the load sensor 2s through the support shaft 2b, and that the load sensor 2s can correctly sense a passenger's load. Physically, the convex portion 13 and the pair of flange portions 11 and 12 are coupled through the pair of connections 17a and 17b, so that it cannot be said that a stress produced at the pair of flange portions 11 and 12 does not affect the convex portion 13 at all.

As for the feature that the pair of slots 15 and 16 reduce a distortion that the pair of flange portions 11 and 12 provide to the convex portion 13, the distortion may include, for example, a distortion produced by such a process that a fastening torque of the pair of nuts in leans to one side, so that the pair of flange portions 11 and 12 may be distorted, which applies pressure to the support shaft 2b (see FIG. 6A). Further, the distortion may include, for example, a distortion produced by such a process that the mounting position of the bolts is not appropriate, so that the pair of flange portions 11 and 12 may be distorted by being compressed to each other, which applies pressure to the support shaft 2b (see FIG. 6B). Furthermore, the distortion may include, for example, a distortion produced by such a process that the flatness of the upper slide rail is not excellent, so that the pair of flange portions 11 and 12 undergo a turning moment and may be distorted, which may deform the support shaft 2b (see FIG. 6C).

The pair of slots 15 and 16 is effective in reducing a stress to the convex portion 13 for supporting the load cell 2 by making a stress of the flange portions 11 and 12 detour the both sides of the support 2. When making a tensile stress act on the plate formed with elliptic holes, stress concentration occurs at the two opposite elliptic holes orthogonal to the direction of tensile stress. Using such a phenomenon, the pair of slots 15 and 16 reduces a stress to the convex portion 13.

In order to complement stress concentration resulting from arrangement of the pair of slots 15 and 16, the pair of ribs 17 and 18 is arranged at the both sides of the support 2. The pair of ribs 17 and 18 function as reinforcing members provided to the plane at right angles so as to prevent a deformation of the support 1. In such a way, arrangement of the pair of ribs 17 and 18 at the support 1 allows the seat-weight sensor 10 to cope with tensile load acting thereon in the event of minor collision of the automotive vehicle, for example.

As described above, according to the present invention, the seat-weight sensor is configured to have a pair of slots arranged at a perimeter of the convex portion holding the support shaft of the load cell, the pair of slots reducing a stress that the pair of flange portions provides to the convex portion. This seat-weight sensor has advantages of no use of a lot of parts as distinct from the related art and no exertion of a bad influence on the load sensor arranged in the load cell through the support shaft when fastening the flange portions to the slide rail.

According to the present invention, the seat-weight sensor is configured to have a pair of ribs arranged at the both sides of the support so as to complement stress concentration resulting from arrangement of a pair of slots. With this, the strength of the support can be maintained without interfering correct measurement by the load sensor.

According to the present invention, the seat-weight sensor is adopted principally to sense a load of a passenger sitting on a seat of the automotive vehicle. Optionally, on the basis of a technical idea of the present invention, the seat-weight sensor can be applied to various seat structures 0such as a chair, sofa, bed, aircraft seat, train seat, etc.

While the preferred embodiment of the present invention has been described and illustrated above, it is to be understood that this is exemplary of the invention and is not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A seat-weight sensor for sensing a load of an occupant sitting on a seat, the seat-weight sensor being interposed between the seat and a vehicle floor, comprising:
   a load cell having a load sensor arranged therein; and
   a support that holds the load cell,
   the support including a convex portion to hold the load cell and a pair of flange portions arranged at both sides of the convex portion and fixed to a vehicle floor side,
   the support having a pair of slots arranged at a perimeter of the convex portion, the pair of slots reducing a physical effect that the pair of flange portions provides to the convex portion,
   wherein the support includes a pair of side portions that extends from the convex portion to ends of the pair of flange portions, and wherein the pair of flange portions and the convex portions are separated by the pair of slots to form a discontinuity therebetween.

2. The seat-weight sensor as claimed in claim 1, wherein the physical effect includes a stress.

3. The seat-weight sensor as claimed in claim 1, wherein the physical effect includes a distortion.

4. The seat-weight sensor as claimed in claim 1, wherein the side portion includes a rib being protuberant at the side of the flange portion.

5. The seat-weight sensor as claimed in claim 4, wherein the rib is connected to the convex portion.

6. The seat-weight sensor as claimed in claim 1, wherein the pair of slots each comprise a first slot portion extending in a direction substantially orthogonal to a direction going from the convex portion to the ends of the pair of flange portions and a pair of second slot portions each turning from a terminal end of the first slot portion and extending in parallel to the direction going from the convex portion to the ends of the pair of flange portions so as to approach the corresponding second slot portion.

7. The seat-weight sensor as claimed in claim 1, wherein the seat-weight sensor is arranged in each of four corners of the seat.

8. The seat-weight sensor as claimed in claim 1, wherein the convex portion holds a support shaft of the load cell perpendicularly.

9. The seat-weight sensor as claimed in claim 1, wherein the load cell is fixed to a seat frame of the seat and the flange portion of the support is fixed to an upper slide rail.

10. A support for holding a load cell in a seat-weight sensor for sensing a load of an occupant sitting on a seat, the seat-weight sensor being interposed between the seat and a vehicle floor,
- wherein, the support including a convex portion to hold the load cell and a pair of flange portions arranged at both sides of the convex portion and fixed to a vehicle floor side,
- the support having a pair of slots arranged at a perimeter of the convex portion, the pair of slots reducing a physical effect that the pair of flange portions provides to the convex portion,
- wherein the support includes a pair of side portions that extends from the convex portion to ends of the pair of flange portions, and wherein the pair of flange portions and the convex portions are separated by the pair of slots to form a discontinuity therebetween.

11. The support as claimed in claim 10, wherein the physical effect includes a stress.

12. The support as claimed in claim 10, wherein the physical effect includes a distortion.

13. The support as claimed in claim 10, wherein the side portion includes a rib being protuberant at the side of the flange portion.

14. The support as claimed in claim 13, wherein the rib is connected to the convex portion.

15. The support as claimed in claim 10, wherein the pair of slots each comprise a first slot portion extending in a direction substantially orthogonal to a direction going from the convex portion to the ends of the pair of flange portions and a pair of second slot portions each turning from a terminal end of the first slot portion and extending in parallel to the direction going from the convex portion to the ends of the pair of flange portions so as to approach the corresponding second slot portion.

16. The support as claimed in claim 10, wherein the convex portion holds a support shaft of the load cell perpendicularly.

17. The support as claimed in claim 10, wherein the flange portion of the support is fixed to an upper slide rail.

* * * * *